W. ALBERTSON.
Bomb-Lance.
No. 7,777.                                    Patented November 19, 1850.
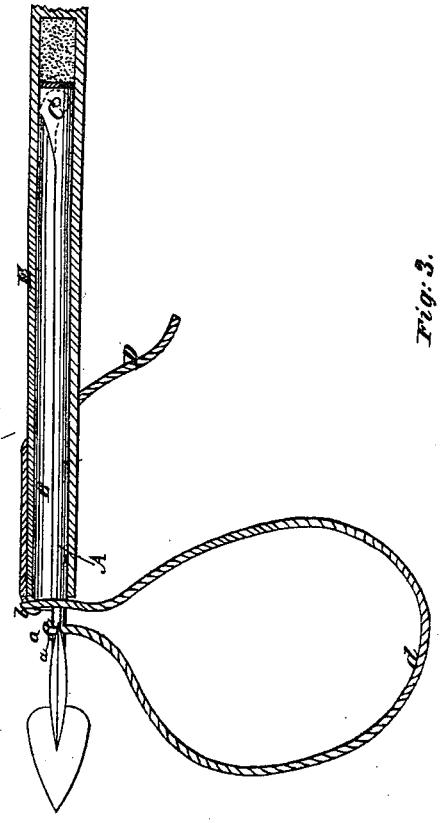
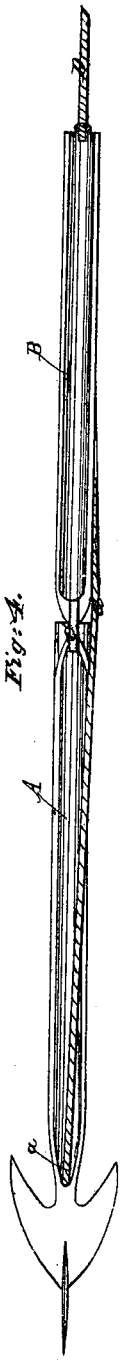

UNITED STATES PATENT OFFICE.

WILLIAM ALBERTSON, OF NEW LONDON, CONNECTICUT.

HINGED GUN-HARPOON.

Specification forming part of Letters Patent No. 7,777, dated November 19, 1850.

*To all whom it may concern:*

Be it known that I, WILLIAM ALBERTSON, of the city and county of New London, and State of Connecticut, have invented a new and useful Improvement in Gun-Harpoons or other Irons to be Used in Whale-Fishing, &c.; and I do hereby declare that the following is a full, clear, and exact description of the same, reference being had to the accompanying drawings, forming part of this specification, in which—

Figure 1 represents a section of the barrel of a gun, showing the harpoon ready for being projected. Fig. 2 is a transverse section of the shank when folded. Fig. 3 is an edge view of the harpoon in its flight. Fig. 4 is a face view of the same.

Similar letters of reference indicate corresponding parts in each of the several figures.

The nature of my invention consists in making the shanks of harpoons or other whale-irons with a hinge-joint at or near the middle of their length, which admits of their being folded and inserted nearly up to the head within the barrel of a gun, being so formed as to fit easily in the said barrel. The line is made fast to the shank close to the head and also at the end.

The part of the line between the head and the end of the shank which lies close to the shank during the flight of the harpoon or while the shank is straightened is folded when the shank is in the gun, and hangs outside in the form of a loop. By this contrivance the line can be made fast to the end of the shank as well as near the head without placing it in the barrel of the gun; and the shank (each joint being in the form of half a cylindrical tube or otherwise hollowed out for the sake of lightness) may be made to fit the barrel of the gun so as to be capable of being projected with great accuracy without rendering it necessary to make it of great weight.

To enable others skilled in the art to make and use my invention, I will proceed to describe its construction and operation.

A B represent the two parts forming the shank of the harpoon, the part A carrying the head. They are jointed together by a hinge-joint at C. Each part is hollowed out on one side and rounded on the other, so that when the two parts are folded together they form a hollow tube. (See Figs. 1 and 2.)

D is the line. Its end is secured by splicing or otherwise to the shank at *a* near the head, and is also secured in any convenient manner to the end of the shank at *b*, from which it leads to a coil. E, Fig. 1, represents the gun-barrel.

Its operation and effect are as follows: When it is desired to project or throw the harpoon it is folded as shown in Fig. 1, and is inserted in the gun E (in which it fits easily) nearly up to its head, the parts *a* and *b* being just outside the muzzle. The part *d* of the line D, between *a* and *b*, hangs loosely in a loop below the muzzle. The part D leading to the coil is shown in the figures as being broken off. The gun (having been loaded previous to inserting the harpoon) is then discharged and the harpoon projected. As soon as the harpoon leaves the gun the weight or drag of the line D draws upon the part B of the shank and throws it back, extending the shank to the position represented in Figs. 2 and 3, and stretching the part *d* of the line so as to cause it to lie alongside the shank and to assist in keeping it straight, which assistance is, however, scarcely necessary, owing to the great force with which it is impelled.

In consequence of the shank A B (when folded) fitting in the barrel of the gun nearly up to the head of the harpoon, it is projected with very great force and with greater accuracy than any other harpoon. It has also been found by experiment to produce less recoil when discharged than when the rope is folded and placed in the gun with the shank, while at the same time it possesses the same advantage—viz., that of allowing the line to be made fast at or near the back end of the shank.

What I claim as new in my invention, and desire to secure by Letters Patent, is—

Making the shank of harpoons and other whale-irons to fold by a hinge or joint at any convenient point in their length, in the manner and for the purposes substantially as herein described.

WILLIAM ALBERTSON.

Witnesses:
HENRY T. BROWN,
S. H. WALES.